Patented June 25, 1940

2,205,950

UNITED STATES PATENT OFFICE 2,205,950

EMULSIONS, SUSPENSIONS, AND LIKE DISPERSIONS

Lawrence H. Flett, Hamburg, N. Y., assignor to National Aniline & Chemical Company, Inc., New York, N. Y., a corporation of New York No Drawing. Application September 25, 1935, Serial No. 42,162

13 Claims. (Cl. 252—6)

This invention relates to compositions comprising emulsions, suspensions and like dispersions of liquids and solids, particularly of liquid and solid material insoluble in water, and to compositions for producing such emulsions, suspensions and like dispersions.

According to the present invention emulsions, suspensions and like dispersions of liquids and solids of low solubility, and particularly aqueous emulsions, suspensions and other dispersions thereof, are prepared with the aid of a composition comprising an alkyl phenol sulfonic acid compound which corresponds with the general formula

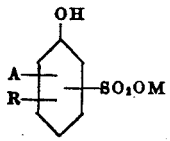

in which A represents hydrogen or a methyl group, R represents a nuclear alkyl hydrocarbon radical (saturated or unsaturated) containing 12 or more (preferably 12 to 23, and especially 14 to 19) carbon atoms, and M represents hydrogen or a metal, particularly an alkali metal, or an ammonium or organic ammonium radical.

The said alkyl phenol sulfonic acid compounds employed in accordance with the present invention are derivatives of phenol (hydroxybenzene) and of the cresols (1.2-, 1.3-, and 1.4-methylhydroxybenzene) in which the alkyl hydrocarbon radical represented by R in the foregoing formula is directly linked to a nuclear carbon atom and in which the sulfonate group (represented in the foregoing formula by —SO₂OM) is also directly linked to a nuclear carbon atom. For convenience they will be hereinafter referred to as "alkyl phenol sulfonates," which term generically includes the phenol and cresol derivatives, in the form of the free acids or the salts. The alkyl phenol sulfonates preferably employed in accordance with the present invention are those in which the alkyl group contains a branched carbon chain, whether linked to the benzene nucleus by an end carbon atom (an alpha carbon atom) or an intermediate carbon atom (that is, whether a primary, secondary or tertiary alkyl group).

It has been found according to the present invention that the said alkyl phenol sulfonates have the valuable property of imparting excellent, and often unusually intensive, dispersing and emulsifying characteristics to compositions containing them whereby they are rendered of great value where suspension, emulsification, dispersion and/or colloidal solution is required. Because of their hydrotropic nature, they are valuable ingredients of compositions in which solids and liquids which are insoluble or almost insoluble in water are desired to be held in solution or colloidal suspension or are desired to be solubilized. The dispersing power of the said alkyl phenol sulfonates makes them valuable ingredients for making aqueous compositions comprising dispersions of pigments and other insoluble solid substances such as vat dyes, colloidal sulfur, blanc-fixe, carbon (soot), minerals, etc., and in the making of lake pigments, inks, plastics, etc. The emulsifying and dispersing power imparted to compositions containing the said alkyl phenol sulfonates also makes them valuable components of germicides, insecticides, fungicides and other parasiticides in which preparations they cause emulsification and uniform dispersion of active ingredients. Further, in view of their strong penetrating and wetting properties the said alkyl phenol sulfonates insure intimate contact with surfaces to which the preparations are applied. For the same reasons they are valuable ingredients of oils applied as boring oils, lubricants, etc., for machinery or for spinning processes or for products such as leather.

The dispersions may be made with the aid of the said alkyl phenol sulfonates in any suitable manner; as by adding the solid, in finely divided form, to a dilute or concentrated solution of said alkyl phenol sulfonate; or the said alkyl phenol sulfonate may be incorporated with the solid before addition to the liquid medium; or the solid may be caused to form in the composition in the presence of the said alkyl phenol sulfonates.

The following examples illustrate several methods of preparing alkyl phenol sulfonates useful in connection with the present invention. It will be evident from a consideration of the disclosure herein that the invention is not limited to the use of products prepared in this manner but includes products of the type referred to herein prepared in other ways. The parts are by weight and temperatures are in degrees centigrade.

Example 1.—100 parts of commercial cetyl alcohol (containing 30 to 40 per cent of normal cetyl alcohol, 30 to 40 per cent of higher alcohols than cetyl, e. g., stearyl alcohol, etc., about 10 per cent of normal lauryl alcohol and about 20 per cent of normal myristyl alcohol), 100 parts of phenol, and 100 parts of anhydrous zinc chloride are heated at 160° to 180° under a reflux condenser, with agitation for 16 hours. The condensation product is washed with water until practically free from water soluble products. The resulting oil is fractionally distilled in vacuo. The fraction of the distillate which is collected between 195° and 240° at 15 mm. pressure of mercury is a faint yellow to water-white oil consisting chiefly of a mixture of alkyl phenols having the probable general formula:

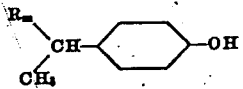

in which $R_m$ is a straight chain hydrocarbon radical having the formula:

$C_{10}H_{21}$, $C_{12}H_{25}$, $C_{14}H_{29}$ or $C_{16}H_{33}$, the compound in which $R_m$ is $C_{14}H_{29}$ being a predominating compound with a small amount of normal alkyl phenols and probably some ortho isomers present.

100 parts of the resulting purified alkyl phenol mixture, 40 parts of acetic anhydride and 160 parts of sulfuric acid monohydrate are mixed together and warmed gently to 70° to 75° until the product is completely soluble in water and a neutral 0.2 per cent solution does not precipitate calcium salts from a calcium chloride or other soluble calcium salt solution containing the equivalent of 0.224 gram calcium oxide per liter. The mass is diluted with water to a final volume of 450 to 600 parts and neutralized with alkali, as for example, caustic soda or caustic potash or their equivalents. The neutral solution is clarified, if desired by filtration, and evaporated to dryness. The product is a brown to white solid soluble in water to give brown to water-white solutions. It comprises a mixture of inorganic salts (e. g., sodium sulfate) with sulfonates of the said alkyl phenols (e. g., in the form of the sodium salts), of which mixture the inorganic salts constitute in the neighborhood of 60 per cent. The alkyl phenol sulfonates present are soluble in alcohol, benzene and other organic solvents.

*Example 2.*—700 parts of an olefine with a boiling point ranging from 237° to 262° and having an average carbon content of 14 to 15 carbon atoms (and obtained by dechlorination of the monochlor hydrocarbons separated by fractionation from the products resulting from chlorination of petroleum distillates which boil at approximately 250° at atmospheric pressure), 700 parts of phenol, and 350 parts of anhydrous zinc chloride are mixed and heated together while agitated under reflux condenser at a temperature around 180° to 190° for from 5 to 16 hours. The condensed mass is diluted and washed with water until reasonably free of water-soluble impurities, and the crude brownish oil is distilled under vacuo. The fraction of the distillate boiling between 195° and 240° at 15 mm. pressure is separately collected. It is a faintly colored to water white oil, insoluble in water and dilute caustic soda.

100 parts by weight of the resulting oil are mixed with 148 parts by weight of sulfuric acid monohydrate at 30°, then heated to 70°–75° and held there until a sample is completely soluble in water and in neutral, acid or alkaline aqueous solutions, and a neutral 0.2 per cent solution does not precipitate calcium salts from a soluble calcium salt solution containing the equivalent of 0.224 gram calcium oxide per liter. The sulfonation mix is poured into water, diluted to a final volume of 450 to 600 parts, and made neutral (for example, to delta paper, Congo red paper, brilliant yellow, or brom-cresol-blue) with alkali, for example caustic soda, or potash or their equivalents. The neutral solution is evaporated to dryness. If desired, the neutral solution can be clarified by filtration before being evaporated to dryness.

The product thus obtained is a mixture of which the chief components are alkyl phenol sulfonates having the probable formula.

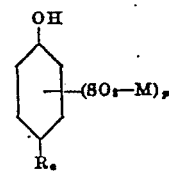

where $R_c$ represents an aliphatic hydrocarbon group, M represents an alkali metal or equivalent derived from the base used for neutralization, and $p$ is 1 or 2 but mainly 1. For the most part, the alkyl phenol sulfonates contain branched carbon chains in the groups represented by $R_c$ and these groups are connected to the phenol nucleus by primary, secondary or tertiary carbon atoms. The chief components of the mixture contain 14 or 15 carbon atoms in the alkyl group represented by $R_c$.

In the form of the alkali metal and alkaline earth salts it is a faintly colored light brown to white, friable solid, readily reduced to a comminuted or powdery form (resembling powdered soap) and readily soluble in water.

It is noted it is not necessary to fractionally distill the alkyl phenol mixtures obtainable in accordance with the first parts of these examples prior to sulfonation thereof for the production of products useful in accordance with the present invention, as it has been found that products having somewhat superior emulsifying action for many organic compounds are obtained by the sulfonation of the crude or undistilled alkyl phenol mixtures.

The products of the above examples contain inorganic salts (e. g., alkali metal sulfates) in admixture with the alkyl phenol sulfonates. When it is desired to employ the alkyl phenol sulfonates in a form free from salts of inorganic acids, which is generally preferable for purposes of emulsification, they may be obtained from the mixed products produced by such processes as are given in the above specific examples by taking advantage of the solubility of the alkyl phenol sulfonate salts in alcohol and other organic solvents. Thus a mixture of a salt of the sulfonated product and an inorganic sulfonate may be extracted with alcohol, and the resulting extract may be evaporated to leave a residue of the purified salt of the sulfonated product, as illustrated by the following specific example.

*Example 3.*—The neutralized solutions containing alkyl phenol sulfonates prepared in Examples 1 and 2, or equivalent aqueous solutions prepared from the final dry sulfonates, are diluted with an equal volume of commercial denatured alcohol, thoroughly mixed for several hours, filtered and evaporated to dryness; or the dry sulfonates are extracted with successive portions of denatured alcohol, the total amount of alcohol used for this extraction preferably being not more than approximately four times the weight of the dry unextracted sulfonate, the combined extracts are mixed and digested with a small amount of animal charcoal, filtered and evaporated to dryness. The residue obtained in either case is an alkyl phenol sulfonate in the salt (e. g., sodium salt) form, practically free from salts of mineral acids. By adding a small amount of alkali before evaporation, a white, friable solid having a soap-like appearance and which is readily soluble in water is obtained.

The following examples illustrate the use of the products hereinbefore described. These examples are directed to the use of the mixed products resulting from the processes of Examples 1 and 2 in the form of the sodium salts and containing sodium sulfonate and other impurities resulting from the said processes unless otherwise specified. For convenience, the said mixed products are hereinafter identified as "sodium secondary hexadecyl phenol sulfonate" and "sodium tetradecyl phenol sulfonate," respectively. It will be understood, however, that these examples are merely illustrative and that any of the other sulfonated products herein described may be similarly employed. The parts are by weight.

Example 4.—0.75 part of sodium secondary hexadecyl phenol sulfonate is dissolved in 23 parts of water at 100°. 5 parts of carnauba wax are melted by heating to 85° to 90° and the molten wax is added with vigorous stirring to the sodium hexadecyl phenol sulfonate solution The resulting product is a smooth, cream-colored emulsion. It has very marked cleansing and polishing properties when applied in the usual manner to furniture, automobiles, leather, etc. In this example, other waxes may be used; for example, montan wax, beeswax, ozokerite, etc.

Example 5.—Solvent composition.—An aqueous solution is made by dissolving in 20 parts of water 20 parts of sodium secondary hexadecyl phenol sulfonate, or of tetradecyl sodium phenol sulfonate, which has been practically free from salts of inorganic acids by alcohol treatment (see Example 3). While this cold solution is agitated thoroughly, 60 parts of mineral oil (white oil viscosity 85) are added very slowly to insure excellent mixing. The resulting creams disperse readily in water to give substantially stable mineral oil emulsions suitable for textile or parasiticidal purposes. In this example, other oils may be used; for example, animal and vegetable oils.

Example 6.—2 parts of tetradecyl phenol (as prepared in Example 2) are mixed with 50 parts of sodium tetradecyl phenol sulfonate. The mixture is converted to a paste by addition of 20 parts of water. One part of the resulting paste forms a solution when added to 100 parts of water.

Example 7.—0.2 gram of capryl alcohol is emulsified in water with 1 gram of sodium hexadecyl phenol sulfonate as obtained in accordance with above Example 3, and the resulting emulsion is diluted with water to a total volume of 60 cc. The resulting solution is clear notwithstanding the presence of the water-insoluble capryl alcohol and remains clear on further dilution even to 0.1 per cent solution of the mixture in water.

Example 8.—A mixture of 0.1 gram of capryl alcohol and 0.1 gram of p-tertiary amyl phenol is emulsified by means of 1 gram of sodium hexadecyl phenol sulfonate (free from inorganic salts) in accordance with the procedure of Example 7. The resulting composition also remains clear on dilution with water to 120 cc. (to form a 1 per cent solution) and even when diluted with water to a 0.1 per cent solution.

Instead of the water-insoluble compounds employed in Examples 6, 7 and 8, other insoluble organic compounds (liquid or solid) containing a hydroxyl group or an amino group, or mixtures of two or more thereof, can be similarly employed, more particularly an alcohol containing at least 6 carbon atoms or an alkyl phenol (or alkyl cresol) containing more than 3 carbon atoms in an alkyl group or an aliphatic amine (primary, secondary or tertiary) containing at least 8 carbon atoms.

Example 9.—Pigment dispersion.—½ part of lamp black is added to a solution of 1 part of sodium secondary hexadecyl phenol sulfonate dissolved in 500 parts of water. The very marked dispersing properties of the hexadecyl phenol sodium sulfonates is shown by the rapidity with which the lamp black is dispersed throughout the solution.

Example 10.—Emulsion for softening tanned leather.—6 parts of sodium secondary hexadecyl phenol sulfonate, or 12 grams of sodium tetradecyl phenol sulfonate, are dissolved in 80 parts of water at room temperature and the solution is stirred for some time with 80 parts of neat's-foot oil. The resulting mixture on dilution in the fat liquoring bath forms an emulsion of neat's-foot oil with superior and rapid penetrating and softening power when applied as a softening agent to leather. As compared with the effect of neat's-foot oil when used alone, the mixture penetrates the leather much more rapidly (in about 75% of the time) and thoroughly. In addition, it inhibits mildew on the treated leather.

Example 11.—Lake pigment manufacture.—1 part of Lake Orange A (color index No. 151) and 1 part of sodium secondary hexadecyl phenol sulfonate, or of sodium tetradecyl phenol sulfonate, are dissolved in 100 parts of hot water. To this solution is added 200 parts of aluminum hydrate paste (3 grams on dry basis), and the lake is precipitated at 70° with 100 parts of a 10 per cent barium chloride solution. The lake pigment is then filtered off, washed, and dried in the usual manner. The effect of the alkyl phenol sulfonate is to disperse the pigment in fine form, thereby getting a much stronger shade of color than when the procedure is carried out without addition of the alkyl phenol sulfonate.

Example 12.—Vat dyeing by the pad and jig process.—A vat dye padding liquor is prepared by mixing 40 parts of gum tragacanth (1 per cent solution), 1.5 parts of gum arabic (40 per cent solution), and sufficient water to form 85 parts of solution, adding 3 parts of a 23 per cent paste of Carbanthrene Yellow G (color index No. 1118), 85 parts of water and 1.7 parts of sodium secondary hexadecyl phenol sulfonate. The resulting liquor is padded on raw cotton cloth and the padded cloth is then developed in the usual manner.

The presence of the alkyl phenol sulfonate in the padding liquor markedly increases the dispersing, wetting and penetrating action as is shown by the distinctly deeper paddings which are obtained as compared to like paddings in the absence of said alkyl phenol sulfonate.

Any other vat dye of the anthraquinone, indigoid, thioindigoids, etc., series may be similarly treated.

It will be realized by those skilled in the art that changes may be made in the compositions, and in the processes of preparing and using them, hereinbefore described, without departing from the scope of the invention.

In addition to the above described uses of the sulfonated products employed in accordance with the present invention and in recapitulation of the various uses hereinbefore described for said products, it is noted that the said sulfonated products may be employed for a large variety of purposes wherein dispersing, emulsifying, suspension and similar action is required.

The alkyl phenol sulfonates herein described may also be incorporated into compositions containing colloidal material such as glue, gelatin, starch, dextrine and other material employed for the sizing of textile, fibrous and related substances. In view of the tanning action of the said alkyl phenol sulfonates it is noted when they are used with glue or gelatin, non-acid conditions are preferably employed.

The alkyl phenol sulfonates employed in accordance with the present invention may be prepared in various ways, as disclosed more fully in applications Serial Nos. 691,081 and 691,082, filed September 26, 1933, of which this application is a continuation-in-part. According to one method of preparation, an alkyl phenol or cresol of the type

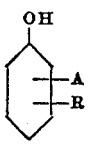

(in which the symbols A and R have the meaning defined above) may be treated with a sulfonating agent, in the presence or absence of a solvent or diluent and/or a sulfonation assistant. As sulfonating agents there may be employed sulfuric acids of various strengths (e. g., 66° Bé. sulfuric acid, sulfuric acid monohydrate, oleum), chlorsulfonic acid, etc. As solvents or diluent there may be employed any inert organic liquid which is not readily sulfonated such as halogenated hydrocarbons of the aliphatic and aromatic series, as for example, carbon tetrachloride, dichlorethane, tetrachlorethane, dichlorbenzene, etc. As sulfonation assistants there may be employed the lower organic acids and/or their anhydrides, as for example, acetic acid, acetic anhydride, etc.

The sulfonation may be carried out with the aid of heating or cooling, as required, depending upon the ease of sulfonation of the alkyl phenol or cresol and the sulfonating power of the sulfonating agents. The sulfonation of the alkyl phenol or cresol may be carried out to an extent such that mainly one, or more or less than one, sulfonic acid group is present in the final product (based on the alkyl phenol or cresol). In general the extent of sulfonation of the alkyl phenol or cresol treated is such as to form chiefly the monosulfonic acid of the alkyl phenol, and to sulfonate impurities as well, if present.

The alkyl phenol sulfonates may be employed in accordance with the present invention in the form of their free sulfonic acids or in the form of salts of metals (as for example, of the alkali metals) or of organic bases, or of ammonia, etc. The salts may be obtained in any suitable manner; for example by reacting the sulfonated product, either in the crude form resulting from the sulfonation or in a purified form, with a metal oxide or hydroxide, ammonia or an organic base, or of a suitable salt of one of these, in an amount adapted to form a neutral product. Among the bases, oxides and salts which may be combined with the sulfonated products to produce salts useful in accordance with the present invention are, for example, sodium, potassium and ammonium hydroxides; sodium, potassium and ammonium carbonates and bicarbonates; ammonia, magnesium oxide; ethylamine; pyridine triethanolamine; propanolamines; butanolamines; diamino propanol; ethylenediamine; triethylene tetramine; etc.

The sulfonated products in the form of metallic salts or salts of inorganic bases are usually yellowish to white, friable solids; and in the form of salts of organic bases vary from viscous oils to semi-solids to solids. In general, the salts are readily soluble in water and in aqueous (neutral, acid or alkaline) solutions to form solutions which are faintly colored brown or yellow, which are of a soapy nature and which foam readily. Certain of the salts, such as the salts of the aromatic monoamines and the aliphatic and aromatic polyamines, are oils which generally are insoluble in water but soluble in organic solvents (as for example, benzene, gasoline, etc.) and in aqueous solutions of alkalis (presumably by conversion to the salts of the alkalis).

It is to be understood that the invention includes the use of products containing a plurality of alkyl phenol sulfonic acid nuclei linked together through the sulfonic acid groups by a polyvalent metal or organic basic radical, as well as products in which an alkyl phenol sulfonic acid is linked through the sulfonic acid group to a different acid compound by a polyvalent metal or organic basic radical.

Thus the invention comprehends compounds of the type $(X)_n-Z-(X')_n$ and $(X)_n-Z-(Y)_n$, wherein X and X' each represent the radical

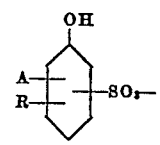

which may be the same or different, Z represents a polyvalent metal or organic base, Y represents a radical containing an acid group, $n$ represents a whole number, and A and R have the meaning defined above. Examples of such types of compounds are

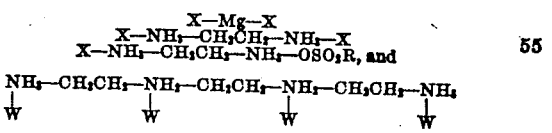

wherein X and R have the meaning defined above, and W represents a radical containing an acid group at least one of which is a radical of the type represented by X.

The alkyl phenols may be prepared in various ways from various intermediates; for example, phenol, ortho-, meta-, or para-cresol, or their mixtures may be condensed with an alkylating agent adapted to substitute an alkyl group containing at least 12 carbon atoms in the aromatic nucleus; or an alkyl ether of phenol or cresol in which an alkyl group containing at least 12 carbon atoms is linked by an oxygen atom to the aromatic nucleus, may be rearranged to the alkyl phenol; or the alkyl group may be substituted in the aromatic nucleus in the form of a ketone by condensing phenol or a cresol with a fatty acid or acid chloride corresponding with the desired alkyl group, in place of an alkylating agent in the process just enumerated, and subsequently reducing the resulting ketone.

In the condensation of phenol or a cresol with an alkylating agent there may be employed as alkylating agents non-aromatic alcohols (as for example, straight-chain, primary monohydric alcohols; straight-chain, secondary monohydric alcohols; branched-chain primary alcohols; branched-chain secondary alcohols; tertiary alcohols of all types; etc.), olefine hydrocarbons containing straight- or branched-chains, and containing a double bond preferably between the ultimate and penultimate carbon atoms; and halogen derivatives of hydrocarbons; all containing at least 12 carbon atoms and preferably 12 to 23 carbon atoms in an alkyl hydrocarbon chain. A preferred alkylating agent is commercial cetyl alcohol containing a mixture of normal alcohols, including a major proportion of cetyl alcohol together with lauryl alcohol, myristyl alcohol and alcohols higher than cetyl, e. g., stearyl, etc. As condensing agents there may be employed anhydrous zinc chloride, anhydrous aluminum chloride, anhydrous antimonic chloride, anhydrous ferric chloride, zinc, sulfuric acid (66° Bé., monohydrate, oleum), etc.

It is to be noted that mixtures of two or more of the sulfonated products hereinbefore referred to may be employed. Furthermore, any of the said sulfonated products or their mixtures may be employed in connection with other hydrotropic substances; dispersing, emulsifying and/or penetrating agents; aliphatic or aromatic sulfonic acids; acid alkyl esters of sulfuric acid; sulfonation products of petroleum oil; alkyl aryl sulfonates free from a nuclear hydroxyl group; and/or their derivatives.

For the purpose of illustration, the following additional products, in the form of the free sulfonic acids and in the salt (e. g., sodium salt) form, are mentioned as suitable for use in accordance with the present invention; but the invention is not limited thereto, as will be evident from the disclosure herein:

Cetyl phenol sulfonate (resulting from the condensation of cetyl alcohol with phenol and sulfonation of the resulting cetyl phenol);

Alkyl ortho-, meta- or para-cresol sulfonates, or mixtures thereof, in which the alkyl groups correspond with the alcohols contained in commercial cetyl alcohol (and obtainable by condensing commercial cetyl alcohol with ortho-, meta- or para-cresol and sulfonating the resulting mixture of alkyl ortho-, meta- or para-cresols);

Lauryl phenol or cresol sulfonates or mixtures thereof with homologous alkyl phenol or cresol sulfonates (obtainable by condensing phenol or cresol with a commercial mixture of lauryl alcohol and homologous fatty alcohols corresponding with the fatty acids of cocoanut oil, and sulfonating the resulting alkyl phenol or alkyl cresol mixture);

Octadecyl (stearyl) phenol sulfonate (1-methyl-heptadecyl phenol sulfonate);

Normal primary hexadecyl phenol sulfonate (obtainable by reducing palmito- (hydroxy) benzophenone and sulfonating the resulting alkyl phenol;

Pentadecyl phenol sulfonate (obtainable by condensing phenol with the pentadecyl alcohol resulting from the polymerization of amyl alcohol, and sulfonating the resulting alkyl phenol);

Tricosyl phenol sulfonate (obtainable by condensing tricosanol-7 with phenol, followed by sulfonation);

Alpha-alpha-dimethyl-hexadecyl-phenol sulfonate (obtainable by condensing dimethyl pentadecyl carbinol with phenol and sulfonating the resulting alkyl phenol).

I claim:

1. In the production of water-containing emulsions, suspensions and like dispersions of liquids and solids in liquids, the improvement which comprises forming the same with the aid of an alkyl phenol sulfonate containing a single higher alkyl radical, said higher alkyl radical being an alkyl hydrocarbon radical containing at least 12 carbon atoms.

2. In the production of water-containing emulsions, suspensions and like dispersions of liquids and solids in liquids, the improvement which comprises forming the same with the aid of an alkyl phenol sulfonate the alkyl radical consists of an open-chain hydrocarbon radical containing 12 to 23 carbon atoms.

3. In the production of aqueous emulsions, suspensions and like dispersions of liquid and solid substances of low water solubility, the improvement which comprises forming a mixture of one of said substances with an aqueous medium in the presence of an alkyl phenol sulfonate having the general formula

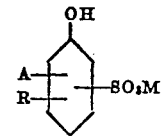

in which A represents hydrogen or a methyl group, R represents an open-chain hydrocarbon radical containing at least 12 carbon atoms, and M represents hydrogen or a metal or an ammonium or organic ammonium radical.

4. In the production of aqueous emulsions, suspensions and like dispersions of liquid and solid substances of low water solubility, the improvement which comprises forming a mixture of one of said substances with an aqueous medium in the presence of an alkyl phenol sulfonate having the general formula

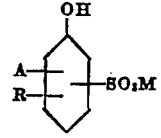

in which A represents hydrogen or a methyl group, R represents an open-chain hydrocarbon radical containing 12 to 23 carbon atoms, and M represents hydrogen or a metal or an ammonium or organic ammonium radical.

5. In the production of aqueous emulsions, suspensions and like dispersions of liquid and solid substances of low water solubility, the improvement which comprises forming a mixture of one of said substances with an aqueous medium in the presence of an alkyl phenol sulfonate having the general formula

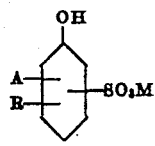

in which A represents hydrogen or a methyl group, R represents an open-chain hydrocarbon radical containing 14 to 19 carbon atoms, and M represents hydrogen or a metal or an ammonium or organic ammonium radical.

6. In the production of dispersions of animal, vegetable and mineral oils in water, the improvement which comprises incorporating into a mixture of the oil and water an alkyl phenol sulfonate containing a single higher alkyl radical, as a dispersing agent, said higher alkyl radical being an open-chain hydrocarbon radical containing at least 12 carbon atoms.

7. A method of dispersing mineral oils in water, which comprises intermixing the mineral oil, water and an alkyl phenol sulfonate containing a single higher alkyl radical said higher alkyl radical being an open-chain hydrocarbon radical containing at least 12 carbon atoms.

8. A dispersion comprising water, a substance of low water solubility and an alkyl phenol sulfonate containing a single higher alkyl radical said higher alkyl radical being an alkyl hydrocarbon radical containing at least 12 carbon atoms.

9. An aqueous dispersion comprising a substance of low water solubility dispersed in an aqueous medium including an alkyl phenol sulfonate having the general formula

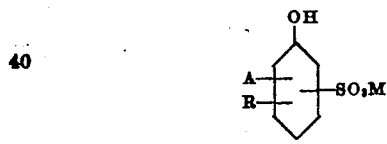

in which A represents hydrogen or a methyl group, R represents an open-chain hydrocarbon radical containing at least 12 carbon atoms, and M represents hydrogen or a metal or an ammonium or organic ammonium radical.

10. An aqueous dispersion comprising a substance of low water solubility dispersed in an aqueous medium including an alkyl phenol sulfonate having the general formula

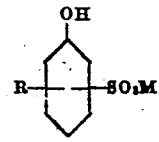

in which R represents an open-chain hydrocarbon radical containing at least 12 carbon atoms, and M represents hydrogen or a metal or an ammonium or organic ammonium radical.

11. A composition comprising water, a mineral oil and, as an emulsifying agent, an alkyl phenol sulfonate containing a single higher alkyl radical, said higher alkyl radical being an open chain hydrocarbon radical containing at least 12 carbon atoms.

12. A composition comprising an emulsion of an oil in an aqueous medium containing an alkyl phenol sulfonate having the general formula

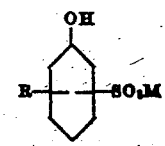

in which R represents an open-chain hydrocarbon radical containing at least 12 carbon atoms, and M represents hydrogen or a metal or an ammonium or organic ammonium radical.

13. A dispersion comprising a liquid and a substance selected from the group consisting of liquids and solids of low solubility in said liquid, one of said liquids being water, and an alkyl phenol sulfonate containing a single higher alkyl radical, said higher alkyl radical being an open chain hydrocarbon radical containing at least 12 carbon atoms.

LAWRENCE H. FLETT.

CERTIFICATE OF CORRECTION.

Patent No. 2,205,950. June 25, 1940.

LAWRENCE H. FLETT.

It is hereby certified that error appears in the printed specification of the above numbered patent requiring correction as follows: Page 5, second column, lines 28 and 29, claim 2, for the words "the alkyl radical consists of" read --containing a single higher alkyl radical, said higher alkyl radical being--; and that the said Letters Patent should be read with this correction therein that the same may conform to the record of the case in the Patent Office.

Signed and sealed this 6th day of August, A. D. 1940.

Henry Van Arsdale,
Acting Commissioner of Patents.

(Seal)